United States Patent
Ohm et al.

(10) Patent No.: US 10,391,995 B2
(45) Date of Patent: Aug. 27, 2019

(54) BRAKE BOOSTER FOR A MOTOR VEHICLE

(71) Applicant: Robert Bosch GmbH, Stuttgart (DE)

(72) Inventors: Andreas Ohm, Kupferzell (DE); Andreas Deberling, Erdmannhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/758,779

(22) PCT Filed: Jul. 13, 2016

(86) PCT No.: PCT/EP2016/066633
§ 371 (c)(1),
(2) Date: Mar. 9, 2018

(87) PCT Pub. No.: WO2017/045798
PCT Pub. Date: Mar. 23, 2017

(65) Prior Publication Data
US 2018/0304876 A1 Oct. 25, 2018

(30) Foreign Application Priority Data
Sep. 14, 2015 (DE) .......... 10 2015 217 530

(51) Int. Cl.
*B60T 13/74* (2006.01)
*B60T 8/40* (2006.01)
*F16H 25/20* (2006.01)

(52) U.S. Cl.
CPC .......... *B60T 13/745* (2013.01); *B60T 8/4077* (2013.01); *F16H 25/20* (2013.01); *F16H 2025/2081* (2013.01)

(58) Field of Classification Search
CPC .... B60T 13/745; B60T 13/143; B60T 8/4077; F16H 25/20; F16H 25/24; F16H 2025/2081

(Continued)

(56) References Cited

U.S. PATENT DOCUMENTS

| 8,348,352 | B2 * | 1/2013 | Nishino | B60T 7/042 303/115.2 |
| 8,500,213 | B2 * | 8/2013 | Ohtani | B60T 7/042 303/113.3 |

(Continued)

FOREIGN PATENT DOCUMENTS

| DE | 102012014361 A1 | 1/2014 |
| DE | 102013006795 A1 | 10/2014 |

(Continued)

OTHER PUBLICATIONS

International Search Report dated Sep. 28, 2016, of the corresponding International Application PCT/EP2016/066633 filed Jul. 13, 2016.

*Primary Examiner* — Thomas W Irvin
(74) *Attorney, Agent, or Firm* — Norton Rose Fulbright US LLP; Gerard Messina

(57) ABSTRACT

A brake booster for a brake master cylinder including a drive motor connected via a linkage to a pressure piston for the brake master cylinder, the linkage having a rotatable spindle nut having an internal thread and a nonrotatable, axially displaceable spindle rod having an external thread, the threads interengaging to convert a rotational motion of the drive motor into a translational motion of the spindle rod in order to displace the pressure piston. The spindle nut has an external tooth set that is in engagement with an internal tooth set of a annular drive gear of the linkage. The spindle nut is axially displaceable with respect to the annular drive gear. Except for a first tooth flank of a tooth, which extends in a first axial portion in its longitudinal extent toward an oppositely located tooth flank, tooth flanks of the internal and external tooth sets extend axially.

10 Claims, 3 Drawing Sheets

(58) Field of Classification Search
USPC .......................................... 303/113.3, 115.2
See application file for complete search history.

(56) References Cited

U.S. PATENT DOCUMENTS

| | | | | |
|---|---|---|---|---|
| 8,783,792 | B2* | 7/2014 | Vollert | B60T 13/745 |
| | | | | 303/113.3 |
| 8,899,696 | B2* | 12/2014 | Weiberle | B60T 1/10 |
| | | | | 303/113.4 |
| 9,428,169 | B2* | 8/2016 | Zhang | B60T 13/745 |
| 9,701,296 | B2* | 7/2017 | Zhang | B60T 13/745 |
| 2009/0261649 | A1* | 10/2009 | Higuma | B60T 8/4275 |
| | | | | 303/113.3 |
| 2010/0242469 | A1* | 9/2010 | Jungbecker | B60T 13/745 |
| | | | | 60/594 |
| 2018/0251114 | A1* | 9/2018 | Deberling | B60T 13/745 |
| 2018/0251115 | A1* | 9/2018 | Nagel | F16H 25/20 |
| 2018/0257624 | A1* | 9/2018 | Deberling | B60T 13/745 |
| 2019/0047532 | A1* | 2/2019 | Ohm | B60T 13/745 |
| 2019/0092298 | A1* | 3/2019 | Bach | B60T 11/18 |

FOREIGN PATENT DOCUMENTS

| | | |
|---|---|---|
| EP | 277097 A1 | 8/1988 |
| JP | 2007523309 A | 8/2007 |
| JP | 2013071536 A | 4/2013 |

\* cited by examiner

BRAKE BOOSTER FOR A MOTOR VEHICLE

SUMMARY

The present invention relates to a brake booster for a brake master cylinder of a motor vehicle, having a drive motor that is connected/connectable via a linkage to a pressure piston for the brake master cylinder, the linkage having a rotatable spindle nut having an internal thread and a nonrotatable, axially displaceable spindle rod having an external thread, the threads interengaging in order to convert a rotational motion of the drive motor into a translational motion of the spindle rod in order to displace the pressure piston.

BACKGROUND INFORMATION

German Patent Application No. DE 10 2012 014 361 A1 describes a brake booster for a brake master cylinder of a motor vehicle, which has a drive motor and a linkage connecting the drive motor to a pressure piston of the brake master cylinder. The linkage has a portion that is embodied as a spindle linkage in order to convert a rotational motion of the drive motor into a translational motion of the pressure piston for actuation of the brake master cylinder. The spindle linkage has for that purpose a rotatable spindle nut having an internal thread, and a nonrotatable spindle rod having an external thread, the two threads being in engagement with one another in order to convert the rotational motion into a translational motion. Conventional spindle linkages may also be equipped with a trapezoidal thread, so that both the internal thread and the external thread are embodied as a trapezoidal thread and engage correspondingly into one another.

SUMMARY

An example brake booster in accordance with the present invention may have the advantage that for the user, an emergency mode is ensured for the case in which the drive motor is not producing, or cannot produce quickly enough, a requested assistance torque. In this case, the present invention makes it possible for the user to initiate and carry out a braking operation mechanically without brake booster assistance. The present invention also makes it possible for the functionality of the emergency function to be testable in simple fashion so that, for example, the user can be warned if the emergency function is defective. According to the present invention, this is achieved in that the spindle nut has an external tooth set that is in engagement with an internal tooth set of a annular drive gear, disposed coaxially with the spindle nut, of the linkage; that the spindle nut is axially displaceable with respect to the annular drive gear; and that except for at least one first tooth flank of at least one tooth, which extends in a first axial portion in its longitudinal extent in a direction leading toward an oppositely located tooth flank, tooth flanks of the teeth of the internal tooth set and of the external tooth set extend axially. The spindle nut is thus axially shiftable with reference to the annular drive gear. This is ensured substantially by the axial extent of the tooth flanks of the teeth of the internal tooth set and external tooth set. Despite an axial shift of the spindle nut with respect to the annular drive gear, rotational entrainment of the spindle nut by the annular drive gear is thereby ensured. Provision is made for this purpose, in particular, that the teeth of the external tooth set have a greater length than the teeth of the internal tooth set, so that the spindle nut is axially shiftable through the annular drive gear while maintaining rotational entrainment. The shiftability ensures that a driver can transfer a braking force mechanically into the brake master cylinder, for example by actuating the brake pedal that is connected mechanically to the pressure piston via the spindle rod, without damaging the linkage or the brake booster, by shifting the spindle rod with the spindle nut axially in the annular drive gear. Provision is made in particular that the spindle rod constitutes the pressure piston of the brake master cylinder. Because at least one first tooth flank of at least one tooth extends, in a first axial portion, divergently from the axial extent of the other tooth flanks, the tooth set has on the first axial portion a region in which the encounter between mutually oppositely located tooth flanks not only transfers a force in a circumferential direction, i.e., a torque, but moreover also generates an axial force acting on the spindle nut, thanks to which the spindle nut is axially shiftable or shifted. The first tooth flank preferably has for that purpose in the first axial portion, in its longitudinal extent, a curvature or an obliquity that extends toward the oppositely located tooth flank in such a way that when the first tooth flank, for example of a tooth of the external tooth set, encounters the oppositely located tooth flank of a tooth of the internal tooth set, the spindle nut becomes axially shifted.

According to a preferred refinement of the present invention, provision is made that the first tooth flank diverges, in the first axial portion, from the axial extent at an angle. The result is that in the first axial portion the first tooth flank exhibits an obliquity that diverges from the axial extent at an angle. The profile of the tooth flank and of the tooth in the longitudinal extent thus changes. Thanks to constitution of the obliquity that deviates from the axial extent at a predetermined angle, what is created in simple fashion is a device that converts the tooth set into a kind of thread. The angle is selected in such a way that self-locking between the external tooth set and the internal tooth set is reliably prevented, and an axial shift of the spindle nut as a result of rotation of the external tooth set with respect to the internal tooth set is ensured. Provision is furthermore preferably made that the angle is selected in such a way that when the first tooth flank is rotated against the oppositely located tooth flank, a force axially displacing the spindle nut is generated.

According to a preferred refinement of the present invention, provision is made that a second tooth flank of the at least one tooth that comprises the first tooth flank that diverges in the first axial portion from the axial extent, extends continuously axially in its longitudinal extent. The result is that the tooth in question has one axially continuous tooth flank and one tooth flank diverging in the first axial portion from the axial extent. The tooth is thus embodied asymmetrically when viewed over its longitudinal extent. What is achieved in particular by way of this embodiment is that in the first axial portion the first tooth exhibits or experiences an enlargement of its tooth width. A further result of the fact that the second tooth flank extends continuously axially is that in a first rotation direction in which only axially extending tooth flanks encounter one another, only a torque is transferred or generated, and in a second rotation direction an axial force is additionally transferred or generated because of the first axial portion.

Provision is preferably made in this context that the respectively mutually oppositely located tooth flanks of the interengaging teeth of the external tooth set and internal tooth set are embodied at least substantially in complementary fashion to one another. For example, if the first tooth flank of the external tooth set has the first axial portion, then a tooth flank, located oppositely from the first tooth flank, of a tooth of the internal tooth set has an axial portion complementary to the first axial portion, the axial portion of the oppositely located tooth flank being directed away from the first tooth flank. The oppositely located tooth flanks thus proceed at least substantially parallel to one another. Provision is preferably made that the first axial portion is longer or shorter than the axial portion of the oppositely located tooth flank. Alternatively, provision is preferably made that the axial portions, embodied in complementary fashion to one another, of the oppositely located tooth flanks are disposed with an axial offset from one another in an initial position, so that upon rotation of the external thread and internal thread with respect to one another in such a way that the two axial portions encounter one another, they slide against one another until the adjacent teeth abut against one another with their axially extending axial portions. The axial shiftability of the spindle nut is thus also limited or defined by the length and obliquity of the first axial portion.

Provision is furthermore preferably made that the first tooth flank of several, in particular of all, teeth of the internal thread or of the external thread respectively diverges, in the first axial portion, from the axial extent at the angle. The fact that the first axial portion is embodied on several or all first tooth flanks, or on several teeth, ensures uniform loading of the tooth set and uniform axial force generation. The "first tooth flanks" of teeth of the internal thread or external thread are to be understood respectively as those tooth flanks of the teeth, located on the same side, which face in the same rotation direction. If the first tooth flanks of several or all teeth of the respective thread exhibit the above-described obliquity, this ensures that the axial force is reliably and uniformly introduced into the spindle nut so as to displace it.

In accordance with a preferred refinement of the present invention, provision is made that the external tooth set and the internal tooth set exhibit, between the mutually oppositely located tooth flanks, a minimum clearance that enables a rotation of the spindle nut with respect to the annular drive gear. This clearance makes it possible for an axial shift of the spindle nut to occur due to a rotation of the annular drive gear, with no actuation of the spindle rod. The clearance between the tooth flanks defines the maximum distance over which the spindle nut is axially shiftable with respect to the annular drive gear as a result of a torque introduced by the annular drive gear.

Provision is furthermore additionally made that the first axial portion is a terminal portion of the external tooth set or of the internal tooth set. Production of the external tooth set and internal tooth set can thereby be achieved in simple and inexpensive fashion, since a divergence from the otherwise axially proceeding tooth profile exists only in the terminal portion. Provision is made in particular that the first axial portion is embodied in such a way that the relevant tooth of the internal tooth set increases in terms of tooth width towards its axial end in the terminal portion, while that tooth of the external tooth set which is complementary thereto decreases in terms of tooth width toward the end, or vice versa.

In accordance with a preferred refinement of the present invention, provision is made that the linkage has associated with it at least one spring element that axially forces an axial stop of the spindle nut against the annular drive gear. The spindle nut is thus moved by the spring element into an initial position in which the axial stop abuts against the annular drive gear. The tooth flanks are embodied in such a way that, proceeding from this initial position, the spindle nut is axially shifted against the force of the spring element upon a rotation of the first axial portion against the oppositely located tooth flank. Automatic return after the shifting of the spindle nut is thereby ensured.

Particularly preferably, provision is made that the spindle nut has associated with it at least one travel sensor that monitors the axial displacement of the spindle nut. It is possible to detect, by way of the travel sensor, whether the rotation of the annular drive gear results in a desired axial displacement of the spindle nut. Only when it is detected that the spindle nut has been axially displaced upon a corresponding activation of the drive motor can it be assumed that the emergency mode of the brake booster is operationally ready because the spindle nut is axially shiftable with respect to the annular drive gear. If what is detected is that the spindle nut has not been axially shifted despite activation of the electric motor, it can be inferred that the spindle nut and annular drive gear are axially adhering to one another and that an emergency mode of the brake booster is therefore not available. Usefully, in this case a warning message is displayed to the user, with an instruction that a visit to a repair shop is necessary.

An example braking device according to the present invention includes a brake booster according to the present invention. The advantages discussed above result therefrom. Further advantages and preferred features may be gathered in particular from the description herein and the figures. Provision is made in particular that the spindle rod is embodied as a pressure piston of the brake master cylinder, thereby making available a particularly compact brake boosting device.

The present invention is explained in further detail below with reference to the figures.

DETAILED DESCRIPTION OF EXAMPLE EMBODIMENTS

Figure 1:
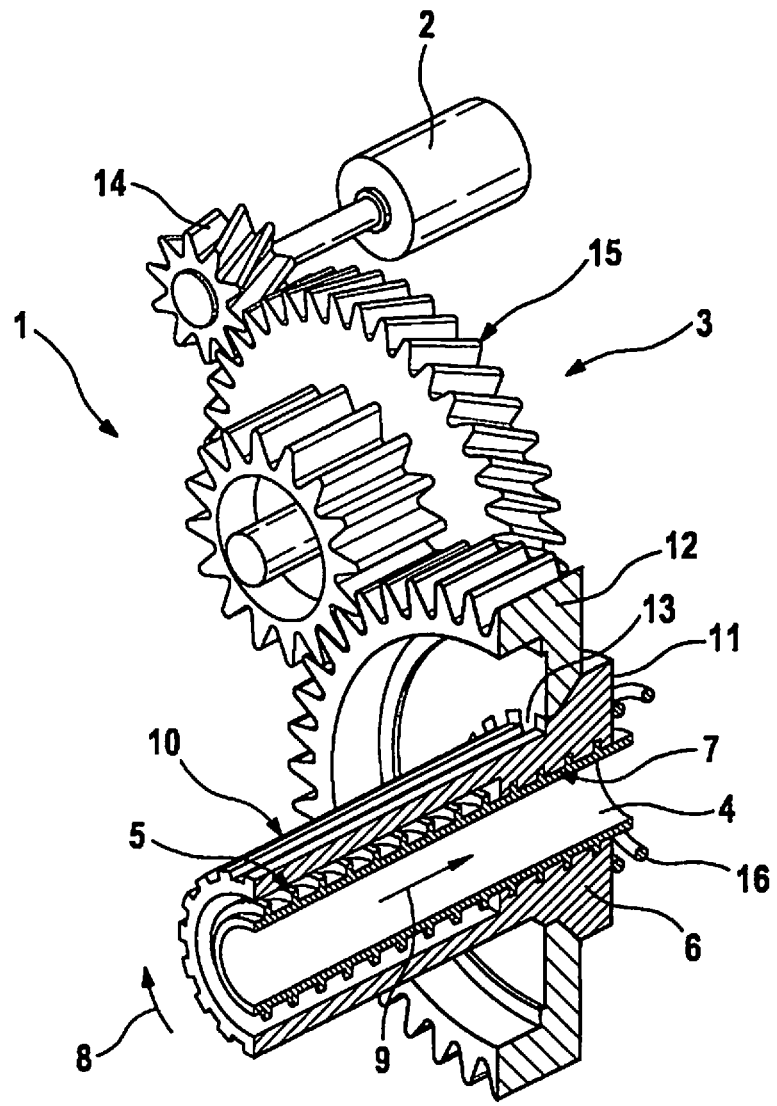
FIG. 1 is a simplified depiction of a brake booster.

FIG. 1 is a simplified depiction of a brake booster for a brake master cylinder (not depicted here in further detail) of a motor vehicle. Brake booster 1 has a drive motor 2, depicted here in simplified fashion, which is embodied as an electric motor and is operatively connected via a linkage 3 to a pressure piston 4.

Pressure piston 4 is depicted in the present case only partly and in longitudinal section. Pressure piston 4 is embodied as a hollow rod that has an external thread. Pressure piston 4 is mechanically connected axially at one end to the brake master cylinder and at the other end to a brake pedal of the motor vehicle having brake booster 1. Pressure piston 4 is embodied axially displaceably so as to exert, upon actuation of the brake pedal, a force on the brake master cylinder for actuation thereof.

Thanks to external thread 5, pressure piston 4 constitutes a spindle rod on which a spindle nut 6 is rotatably disposed. Spindle nut 6 has locally an internal thread 7 that is in engagement with external thread 5. External thread 5 and internal thread 7 are each embodied as a trapezoidal thread. External thread 5 extends, viewed axially, over a portion more than twice as long as internal thread 7. When a rotary motion is imparted to spindle nut 6, as indicated by an arrow 8, because of the interengaging trapezoidal threads this results in an axial displacement of pressure piston 4 constituting the spindle rod, as shown by an arrow 9.

Spindle nut 6 furthermore has an external tooth set 10 having several teeth extending substantially only axially. Spindle nut 6 furthermore has at one end an axial stop 11 that has a conical longitudinal section.

Linkage 3 furthermore has an annular drive gear 12 that has an internal tooth set 13 in engagement with external tooth set 10. Because external tooth set 10 and internal tooth set 13 are axially oriented, spindle nut 6 is axially shiftable with respect to annular drive gear 12. Annular drive gear 12 furthermore has an external tooth set at which annular drive gear 12 is operatively connected to an intermediate gear 15 that has a conversion ratio stage and is operatively connected to a drive pinion 14 of electric motor 2.

When electric motor 2 is activated, a torque is exerted on annular drive gear 12 and, as a result of internal tooth set 13, entrains spindle nut 6 and imparts a rotary motion to it. Because the spindle rod or piston rod 4 is mounted nonrotatably, an axial motion of pressure piston 4 is generated by the rotation of spindle nut 6, and the brake master cylinder is actuated. As a result, an automatic braking operation can be initiated or the driver can be assisted by generation of an additional braking force. If the driver actuates the brake pedal more quickly than electric motor 2 can react, or if electric motor 2 or brake booster 1 has a defect, it is then possible for him or her to actuate pressure piston 4 entirely mechanically because of the axial displaceability of spindle nut 6 with reference to annular drive gear 12. In this context, spindle nut 6 is pushed axially through annular drive gear 12 against the force of spring element 16, which forces spindle nut 6 having axial stop 11 against annular drive gear 12, so that axial stop 11 abuts against annular drive wheel 12 and further displacement is impossible. Linkage 3 is thus preloaded by spring element 16 toward the initial state.

Figure 2A:
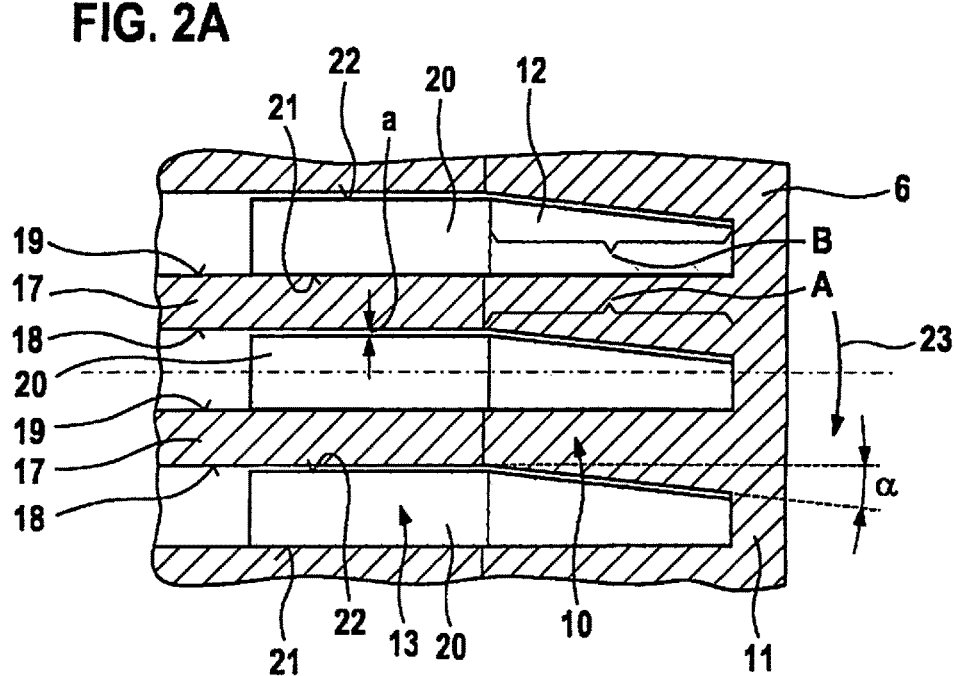
FIGS. 2A and 2B are enlarged detail views of the brake booster in two different operating states.
Figure 2B:
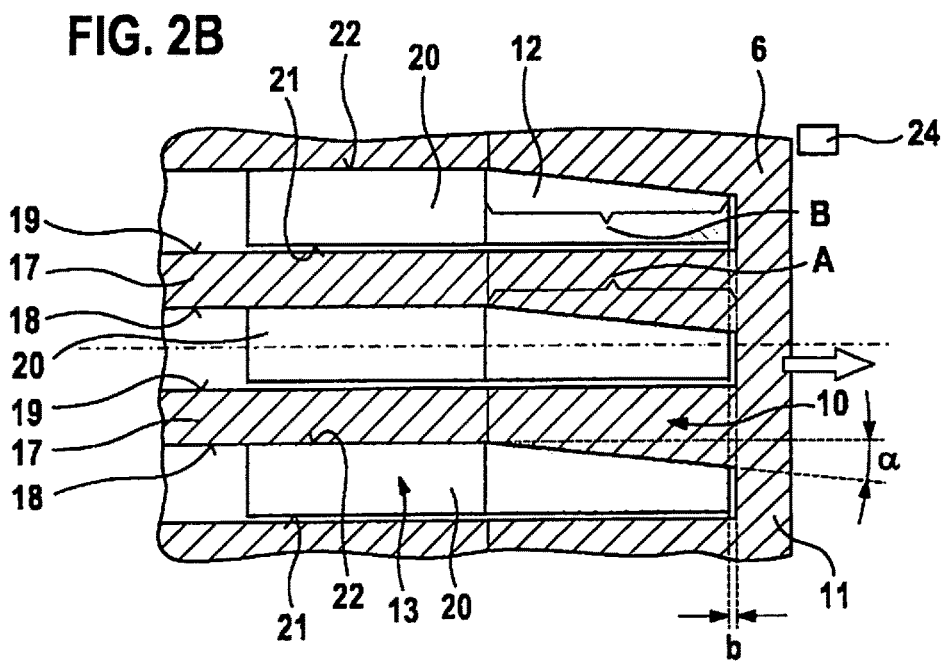

FIGS. 2A and 2B schematically depict the interengagement of internal tooth set 13 of annular drive gear 12 with external tooth set 10 of spindle nut 6 in the region of axial stop 11. Spindle nut 6 having axial stop 11 has been pushed by spring element 16 against annular drive gear 12, so that external tooth set 10 and internal tooth set 13 terminate flush with one another against axial stop 11.

External tooth set 10 has several teeth 17, disposed in distributed fashion over the outer periphery of spindle nut 6, which each have a first tooth flank 18 and a second tooth flank 19. The two tooth flanks 18 and 19 are each located on sides of the respective tooth 17 which face toward one another, and extend substantially axially or parallel to the rotation axis of spindle nut 6, which is indicated in FIGS. 2A and 2B by a dot-dash line. The respective first flank 18 of teeth 17 of external tooth set 10 has, in an axial portion A adjoining axial stop 11, a profile diverging from the axial extent. Provision is made in the present case that in axial portion A, the respective first tooth flank 18 diverges in its longitudinal extent from the axial extent at a predefined angle α. The angle α is to be selected as follows:

$$\alpha > \arctan(\mu) \times f_s,$$

where $f_s$ is a safety factor to be selected, and $\mu$ is the coefficient of friction between internal tooth set 13 and external tooth set 10. The coefficient of friction $\mu$ can be calculated and ascertained empirically. The angle α is selected in such a way that the tooth width of the respective tooth 17 increases toward axial stop 11. The rearward or second tooth flank 19 of the respective tooth 17, conversely, is embodied to extend continuously in straight or axial fashion.

Internal tooth set 13 likewise has several teeth 20 disposed with a regular distribution over the circumference, only three of which are shown in FIGS. 2A and 2B. Teeth 20 also each have a first flank 21 and a second flank 22. First tooth flanks 18, 22 are the tooth flanks that transfer a torque when abutting against one another in a first rotation direction, and second tooth flanks 19, 21 abut against one another in an opposite rotation direction in order to transfer a torque. Tooth flanks 18 and 22, and 19 and 21, of the adjacent teeth 17, 20 of external tooth set 10 and of internal tooth set 13 are thus always located opposite one another. Tooth flanks 21 of teeth 20 likewise extend continuously axially, like tooth flanks 19 that are respectively located opposite tooth flanks 21. Like tooth flanks 18, tooth flanks 22 of teeth 20 have, in an axial portion B adjoining axial stop 11, a profile diverging from the axially extending profile. Provision is made in this context that in the axial portion B, the respective tooth flank 22 diverges from the axial profile at the same angle α as tooth flanks 18, except that the angle α is selected so that the width of teeth 20 decreases toward axial stop 11.

What results from the above-described configuration of teeth 17 and 20 is that they are embodied in complementary fashion to one another especially in the terminal portion toward axial stop 11. In the initial position, which is shown in FIG. 2A and is brought about by spring element 16 as already described above, teeth 17 and 20 terminate axially flush with one another against axial stop 11. Viewed in a circumferential direction, a clearance a exists between teeth 17 and 20 with the result that spindle nut 6 is rotatable through a small angle with respect to annular drive gear 12 in order to take up the clearance, with no transmission of torque. A takeup distance therefore exists between spindle nut 6 and annular drive gear 12.

In normal operation, i.e., when an additional braking force is to be exerted by brake booster 1 on the pressure piston or spindle shaft 4, drive motor 2 is activated in such a way that, as shown by arrow 23, annular drive gear 12 is driven in such a way that the continuously axial extending tooth flanks 21, 19 abut against one another as shown in FIG. 2A. Only a torque is therefore transferred to spindle nut 6, with the result that spindle rod 4 is shifted in controlled fashion.

As is evident from FIG. 1, external tooth set 10 of spindle nut 6 extends over a region or portion that is axially long as compared with annular gear 12. As already mentioned, spindle nut 6 is axially shiftable with reference to annular drive gear 12. This has the advantage that when the driver applies a braking force onto the brake pedal, this can shift the spindle rod, or actuate pressure piston 4 of the brake master cylinder, independently of drive motor 2. This is achieved by the fact that upon an actuation spindle nut 6 is axially shifted, independently of drive motor 2, toward the brake master cylinder with reference to annular drive gear 12, as shown by arrow 9 in FIG. 1. The present embodiment of teeth 17 and 20 is provided in order to check whether that emergency function is available.

To test whether the emergency function is available, drive motor 2 is activated in the opposite direction so that annular drive gear 12 is rotated in the opposite direction, i.e. oppositely to the direction of arrow 23. Because of the flank clearance between the adjacent teeth 17 and 20, the result of this is that firstly the mutually oppositely located tooth flanks 21 and 19 come into abutting contact with one another.

Because of the advantageous embodiment with the obliquely extending tooth flanks 22 and 18 in the region of axial portions A and B, the following happens: Because axial portion B of the outer tooth set is selected to be shorter than axial portion A, firstly the obliquely extending portions of tooth flanks 22 and 18 come into abutting contact. Because, as a result of their oblique orientation with reference to the axial extent of spindle nut 6, an axial force that acts toward spring element 16 or toward axial stop 11 is also generated in addition to a torque, spindle 6 is axially displaced a little way against the force of spring element 16 as a result of the rotation of annular drive gear 12, as shown in FIG. 2B. Spindle nut 6 becomes axially displaced until teeth 17, 20 abut against one another with their respective axially extending tooth flank portions, and no further axial force can be generated. The distance b over which spindle nut 6 is axially displaceable is thus defined by the angle α and by the clearance between the adjacent teeth 17, 20 of internal tooth set 13 and of external tooth set 10.

Spindle nut 6 usefully has associated with it, in housing-mounted fashion, a travel sensor 24 that monitors the axial displacement of spindle nut 6. If travel sensor 24 detects in testing mode that spindle nut 6 has been displaced over the predefined or expected distance b, the functionality of the emergency function is then established. If what is detected, however, is that spindle nut 6 was not axially displaced despite a corresponding activation of drive motor 2, it is then established that the rotary entrainment system constituted by internal thread 13 and external thread 10 is jammed, and spindle nut 6 would not be able to push through and implement emergency operation. Usefully, a warning message is correspondingly outputted to the driver.

For this purpose travel sensor 24 can, for example, detect an end face of spindle nut 6 in noncontact fashion, in particular optically, and thereby monitor a movement of spindle nut 6.

Alternatively or additionally, according to a further exemplifying embodiment provision is made that a rotation angle of drive motor 2 and an operating current of drive motor 2 are monitored upon activation for the testing mode.

Figure 3:
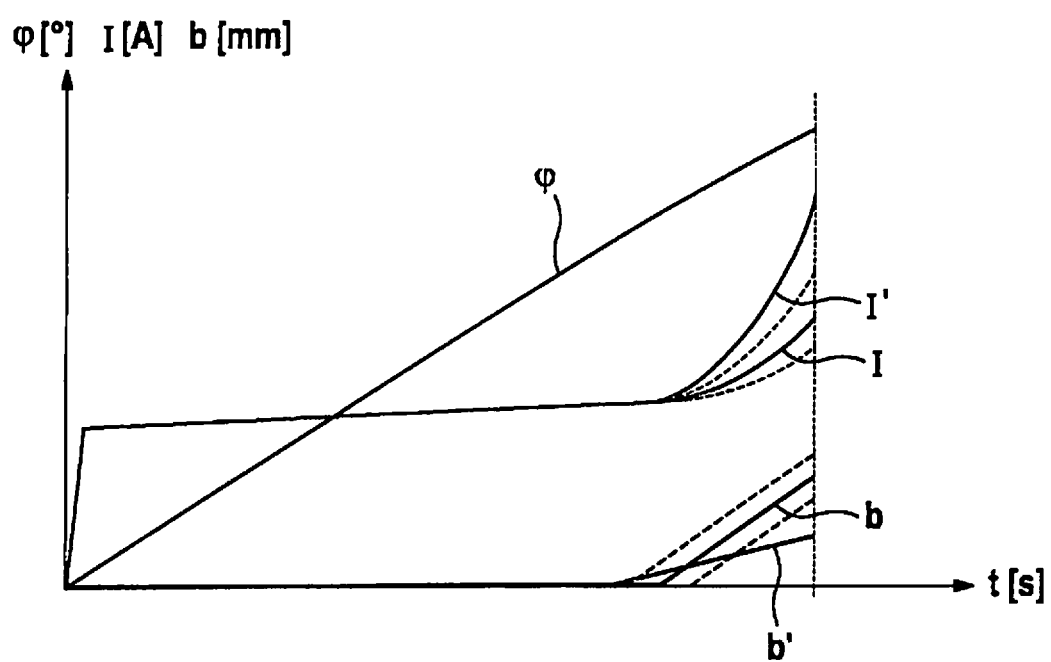
FIG. 3 shows an alternative method for determining an emergency operation property of the brake booster.

FIG. 3 shows in this context a diagram in which the rotation angle φ, current I, and assumed travel b are plotted against time t. The axial travel distance b and the introduced torque can be determined from the present current I and rotation angle φ. Based on the clearances present in linkage 3, it is possible to derive a target curve for the torque which can be compared with the actually measured curve. The presently flowing current I of drive motor 2 is measured as a determining value for the torque. If the measured current I deviates too far from the expected current I, as shown in FIG. 3, the inference is then that freedom of movement cannot be ensured, and a decreased travel distance b' is thus diagnosed.

What is claimed is:

1. A brake booster for a brake master cylinder of a motor vehicle, comprising:
    a drive motor; and
    a linkage, the drive motor connected via the linkage to a pressure piston for the brake master cylinder, the linkage including a rotatable spindle nut having an internal thread, and a nonrotatable, axially displaceable spindle rod having an external thread, the internal thread and the external thread interengaging to convert a rotational motion of the drive motor into a translational motion of the spindle rod to displace the pressure piston; wherein the spindle nut has an external tooth set in engagement with an internal tooth set of an annular drive gear, disposed coaxially with the spindle nut, of the linkage, the spindle nut is axially displaceable with respect to the annular drive gear, and except for at least one first tooth flank of at least one tooth, which extends in a first axial portion in its longitudinal extent in a direction toward an oppositely located tooth flank, tooth flanks of teeth of the internal tooth set and of the external tooth set extend axially.

2. The brake booster as recited in claim 1, wherein in the first axial portion the first tooth flank diverges from the axial extent at an angle.

3. The brake booster as recited in claim 1, wherein a second tooth flank of the at least one tooth extends continuously axially.

4. The brake booster as recited in claim 1, wherein a first tooth flank of one of all teeth of the internal thread or the external thread diverges, in the first axial portion, from the axial extent at the angle.

5. The brake booster as recited in claim 1, wherein respectively mutually oppositely located tooth flanks of the interengaging teeth of the external tooth set and internal tooth set are embodied at least substantially in complementary fashion to one another.

6. The brake booster as recited in claim 1, wherein the external tooth set and the internal tooth set exhibit, between mutually oppositely located tooth flanks, a minimum clearance that enables a rotation of the spindle nut with respect to the annular drive gear.

7. The brake booster as recited in claim 1, wherein the first axial portion is a terminal portion of one of the external tooth set or of the internal tooth set.

8. The brake booster as recited in claim 1, wherein the linkage has associated with it at least one spring element that axially forces an axial stop of the spindle nut against the annular drive gear.

9. A braking device for a vehicle, comprising:
    a brake pedal mechanically connected to a pressure piston of a brake master cylinder; and
    a brake booster, including a drive motor, and a linkage, the drive motor connected via the linkage to the pressure piston for the brake master cylinder, the linkage including a rotatable spindle nut having an internal thread, and a nonrotatable, axially displaceable spindle rod having an external thread, the internal thread and the external thread interengaging to convert a rotational motion of the drive motor into a translational motion of the spindle rod to displace the pressure piston, wherein the spindle nut has an external tooth set in engagement with an internal tooth set of an annular drive gear, disposed coaxially with the spindle nut, of the linkage, the spindle nut is axially displaceable with respect to the annular drive gear, and except for at least one first tooth flank of at least one tooth, which extends in a first axial portion in its longitudinal extent in a direction toward an oppositely located tooth flank, tooth flanks of teeth of the internal tooth set and of the external tooth set extend axially;
    wherein the spindle rod of the brake booster is one of operatively connected to, or constitutes, the pressure piston.

10. The brake booster as recited in claim 9, wherein the spindle nut has associated with it at least one travel sensor that monitors the axial displacement of the spindle nut.

* * * * *